(12) United States Patent
O'Neil et al.

(10) Patent No.: US 9,140,718 B2
(45) Date of Patent: Sep. 22, 2015

(54) SPEED SENSOR IDENTIFICATION

(71) Applicant: Hamilton Sundstrand Corporation, Windsor Locks, CT (US)

(72) Inventors: John M. O'Neil, Litchfield, CT (US); John J. Nardella, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/190,490

(22) Filed: Feb. 26, 2014

(65) Prior Publication Data

US 2015/0096371 A1   Apr. 9, 2015

Related U.S. Application Data

(60) Provisional application No. 61/886,914, filed on Oct. 4, 2013.

(51) Int. Cl.
| | |
|---|---|
| *G01P 3/64* | (2006.01) |
| *G01H 1/00* | (2006.01) |
| *G01P 3/481* | (2006.01) |
| *G01P 3/488* | (2006.01) |
| *G01P 3/489* | (2006.01) |
| *G01D 5/244* | (2006.01) |
| *F01D 21/00* | (2006.01) |
| *G01B 21/22* | (2006.01) |
| *G01P 3/487* | (2006.01) |

(52) U.S. Cl.
CPC .............. *G01P 3/64* (2013.01); *F01D 21/003* (2013.01); *G01B 21/22* (2013.01); *G01D 5/244* (2013.01); *G01H 1/003* (2013.01); *G01P 3/481* (2013.01); *G01P 3/488* (2013.01); *G01P 3/489* (2013.01); *G01H 1/006* (2013.01); *G01P 3/487* (2013.01)

(58) Field of Classification Search
CPC ........... G01P 3/487; G01P 3/488; G01P 3/44; G01P 3/481; G01P 3/48; F01D 21/003; G01H 1/006; G01H 1/003
USPC ................................................ 73/112.01, 488
See application file for complete search history.

(56) References Cited

U.S. PATENT DOCUMENTS

| | | | |
|---|---|---|---|
| 4,010,637 A |   | 3/1977 | Harwell et al. |
| 4,335,600 A | * | 6/1982 | Wu et al. ..................... 73/112.03 |
| 4,518,917 A | * | 5/1985 | Oates et al. .............. 324/207.25 |
| 4,715,009 A |   | 12/1987 | Bohmler et al. |
| 5,097,711 A | * | 3/1992 | Rozelle et al. .................. 73/660 |
| 5,206,816 A | * | 4/1993 | Hill et al. ......................... 702/56 |
| 5,933,005 A | * | 8/1999 | Pugh .......................... 324/207.25 |

(Continued)

FOREIGN PATENT DOCUMENTS

| | | |
|---|---|---|
| EP | 2073021 A1 | 6/2009 |
| EP | 2312410 A1 | 4/2011 |
| EP | 2594946 A1 | 5/2013 |

OTHER PUBLICATIONS

European Search Report dated Feb. 18, 2015, for corresponding European Patent Application No. 14187607.8.

*Primary Examiner* — Freddie Kirkland, III
(74) *Attorney, Agent, or Firm* — Kinney & Lange, P.A.

(57) ABSTRACT

A method of initializing speed sensors in a rotational system is used determine a sensor spacing. An indexing feature is identified at each of two locations on an outer circumference of a wheel path corresponding to two speed sensors, as well as the speed of the wheel. The spacing of the sensors is then determined.

15 Claims, 3 Drawing Sheets

(56) References Cited

U.S. PATENT DOCUMENTS

| | | | |
|---|---|---|---|
| 6,263,738 B1 * | 7/2001 | Hogle | 73/593 |
| 6,445,995 B1 | 9/2002 | Mollmann | |
| 6,668,651 B2 * | 12/2003 | Beausseroy et al. | 73/579 |
| 6,711,952 B2 | 3/2004 | Leamy et al. | |
| 6,909,948 B2 | 6/2005 | Mollmann et al. | |
| 6,983,199 B2 | 1/2006 | Mollmann et al. | |
| 7,553,087 B2 | 6/2009 | Iwamoto et al. | |
| 7,836,782 B2 * | 11/2010 | Cook et al. | 73/862.338 |
| 8,100,000 B1 * | 1/2012 | Rankin | 73/114.77 |
| 8,222,760 B2 * | 7/2012 | Menke | 290/44 |
| 8,225,671 B2 * | 7/2012 | Zielinski et al. | 73/660 |
| 8,521,493 B2 * | 8/2013 | Jousselin | 703/7 |

* cited by examiner

SPEED SENSOR IDENTIFICATION

CROSS-REFERENCE TO RELATED APPLICATION

This application claims priority to U.S. Provisional Application No. 61/886,914, filed on Oct. 4, 2013, and entitled "Speed Sensor Identification," the disclosure of which is incorporated by reference in its entirety.

BACKGROUND

Speed sensors are commonly used to determine the rotational velocity of components in a gas turbine engine. For example, speed sensors can be used to determine the rotational velocity of a fan section. In addition, speed sensors can be used to determine rotational position of rotating components. Speed sensors can be built into a shroud or support surrounding the fan section. Replacing speed sensors is a time-intensive process, and can result in significant costs and delays.

Speed sensors can be used in combination with vibration sensors, such as accelerometers, to determine the position of imbalances on the rotating component being observed. For example, a speed sensor can be used to calculate the rotational position of the component while an accelerometer senses imbalances. By combining these data, appropriate action may be undertaken to properly balance the rotating load.

SUMMARY

Speed sensors in a rotational system detecting the presence of an indexing feature passing thereby. The position of the sensors is determined based on the spacing between the first speed sensor and the second speed sensor.

DETAILED DESCRIPTION

The position of an imbalance on a rotating component can be calculated by measuring the component's position as a function of time and comparing it to the timing of vibrations indicative of an imbalance. In a system with multiple speed sensors, only a subset of which are online at a given time, the engine control system must identify which speed sensors are online in order to accurately determine the component's angular position as a function of time.

Figure 1:
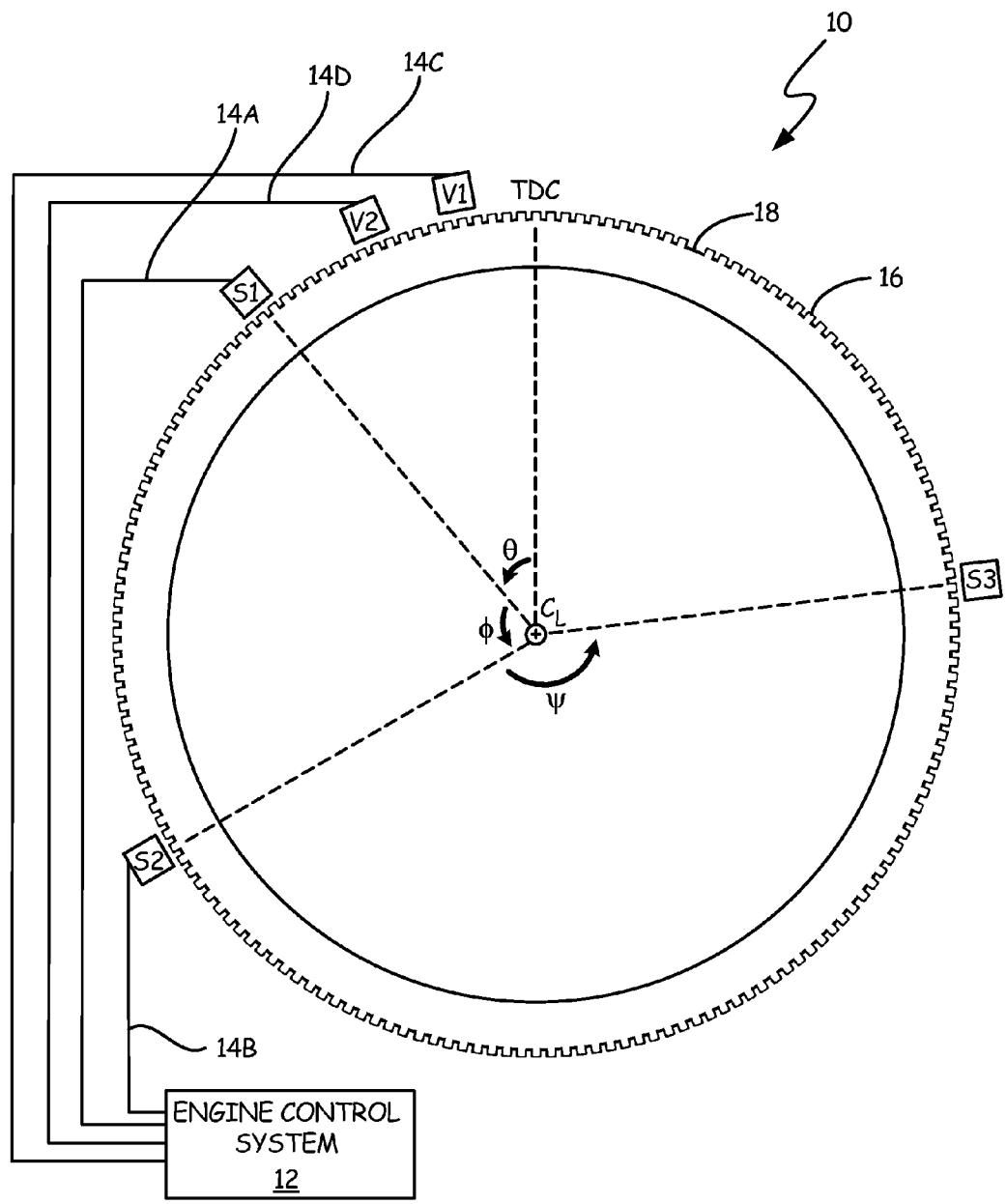
FIG. 1 is a schematic view of a speed sensing system employed in a rotational component.

FIG. 1 is a schematic view of rotating component 10 having speed sensors S1, S2, and S3, and vibration sensors V1 and V2. In one embodiment, rotating component 10 is a geared component that rotates with the fan section of a gas turbine engine (not shown). Speed sensors S1, S2, and S3 are located at specific locations adjacent to an outer circumference of rotating component 10. Vibration sensors V1 and V2 are similarly located adjacent to an outer circumference of rotating component 10. Speed sensors S1, S2, and S3 can be connected to engine control system 12 to deliver data regarding the movement of rotating component 10 about centerline $C_L$. In the embodiment shown in FIG. 1, only two of the three available speed sensors S1-S3 are connected to provide input to engine control system 12. For example, in the embodiment shown in FIG. 1, only speed sensors S1 and S2 are connected to provide input to engine control system 12 via wiring harnesses 14A and 14B, respectively. Likewise, vibration sensors V1 and V2 are electrically connected to engine control system 12 via wiring harnesses 14C and 14D, respectively.

Speed sensors S1, S2, and S3 measure the rotational speed of rotating component 10 by counting the time between the passage of teeth 16 arranged along the outer circumference of rotating component 10 as rotating component 10 rotates about centerline $C_L$. Speed sensors S1, S2, and S3 send data regarding the length of time between passing teeth 16 to engine control system 12. Based on the known spacing of teeth 16, the speed of rotation of rotating component 10 may be ascertained. By multiplying the time between passing teeth 16 with the number of teeth on rotating component 10, the angular frequency of rotating component 10 can also be determined.

In addition, the arrangement of teeth 16 along the outer circumference of rotational component 10 can be used to determine angular position of rotating component 10. For example, in the embodiment shown in FIG. 1, a gap in the regular spacing of teeth 16, labeled indexing feature 18, can be detected by speed sensors S1-S3 and used to determine position of rotating component 10.

Wiring harnesses 14A and 14B can be used to relay data from speed sensors S1 and S2 regarding the position of teeth 16 and/or indexing feature 18 passing thereby during the rotation of rotating component 10. Additionally, wiring harnesses 14C and 14D can be used to relay data from vibration sensors V1 and V2 regarding acceleration of rotating component 10.

Wiring harnesses 14A and 14B are movable between speed sensors S1, S2, and S3 to accommodate failure of one of the speed sensors. For example, in the event of the failure of speed sensor S1, the wiring harness 14A could be moved to instead connect speed sensor S3 to engine control system 12. Engine control system 12 would then receive data from speed sensor S3 on the same channel on which it had previously received data from speed sensor S1.

Engine control system 12 calculates the position and magnitude of imbalances in the rotation of rotating component 10 by calculating the angular position of rotating component 10 while the vibration sensors V1 and V2 detect vibrations. This information can be used for later correction of imbalances. For example, during maintenance, imbalance can be corrected by placing a weight on the rotating component to balance it, or replacing a worn bearing. Speed sensors S1, S2, and S3 generate data regarding the speed and position of rotating component 10 by counting the number of teeth 16 passing by per unit time, as well as detecting indexing feature 18 on each rotation of rotating component 10. By combining the data regarding the passage of indexing feature 18 with the data regarding the speed of rotating component 10, a time-dependent function for the angular position of rotating component 10 may be determined. However, this determination requires that engine control system 12 be able to ascertain what locations (in other words, which two of speed sensors S1, S2, and S3) the data regarding passage of indexing feature 18 is coming from. This is accomplished by spacing speed sensors S1, S2, and S3 unevenly about the circumference of rotating component 10.

Speed sensor S1 is arranged along rotating component 10 at an angle θ from top dead center location TDC. Speed sensor S2 is arranged along rotating component 10 at an angle φ from speed sensor S1, and speed sensor S3 is arranged along rotating component 10 at an angle ψ from speed sensor S2. Angles θ, φ, and ψ, as well as (360°−(θ+φ+ψ)) are not equal to one another; in other words, sensors S1, S2, and S3 are all unevenly spaced about rotating component 10.

Engine control system 12 counts the time delay between receiving data via wiring harness 14A that indexing feature 18 has passed and receiving data via wiring harness 14B that indexing feature 18 has passed. In the embodiment shown in FIG. 1, the spacing between sensors S1 and S2, for example, can be calculated by engine control system 12 using the formula:

$$\text{Spacing} = 360° \times \frac{\text{time index 18 passed } S1 - \text{time index 18 passed } S2}{\text{rotation time}} \quad \text{(Eq. 1)}$$

In operation, engine control system 12 will not know which of sensors S1, S2, and S3 are connected to wiring harnesses 14A and 14B. However, by calculating the value Spacing provided in Equation 1, engine control system 12 can determine which sensors S1, S2, and S3 are connected, because no two sensors are spaced the same distance from one another, and therefore the Spacing result is a unique identifier.

In one embodiment, θ=33°, φ=111°, and ψ=130°. Based on the measured spacing between when the sensor on wiring harness 14A reports that index 18 has passed, as well as when the sensor on wiring harness 14B reports that index 18 has passed, engine control system 12 can use a lookup table to identify which sensor is attached to each wiring harness, as shown in Table 1.

TABLE 1

Table 1-the expected spacing value of each arrangement of speed sensors {S1, S2, S3} with wiring harnesses {14A, 14B} is unique.

| Wiring harness 14A | Wiring harness 14B | expected spacing value |
|---|---|---|
| S1 | S3 | 111° |
| S1 | S2 | 241° |
| S2 | S1 | 119° |
| S2 | S3 | 230° |
| S3 | S2 | 130° |
| S3 | S1 | 249° |

Once engine control system 12 has determined which of sensors S1, S2, and S3 are attached to the wiring harnesses 14A and 14B, vibrations sensed by vibration sensors V1 and V2 can be correlated to rotational positions of rotating component 10.

Various other values of θ, φ, and ψ also produce non-uniform spacing of speed sensors S1, S2, and S3. For example, in another embodiment θ=30.5°, φ=111°, and ψ=130°.

Figure 2A:
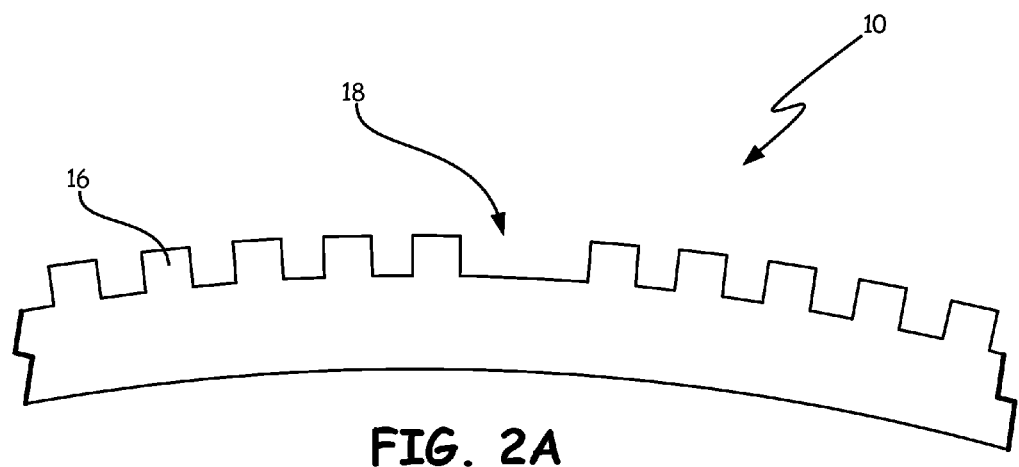
FIG. 2A is a cross-sectional view of a rotational component having a missing tooth indexing feature.

FIG. 2A is a partial cross-sectional view of rotating component 10 illustrating indexing feature 18. Rotating component 10 includes a plurality of teeth 16 arranged about its circumference. Indexing feature 18 is a portion of rotating component 10 along which teeth 16 are not uniformly spaced. Specifically, one tooth 16 is missing from an otherwise uniform spacing pattern of teeth 16 about the circumference of rotating component 10.

Figure 2B:
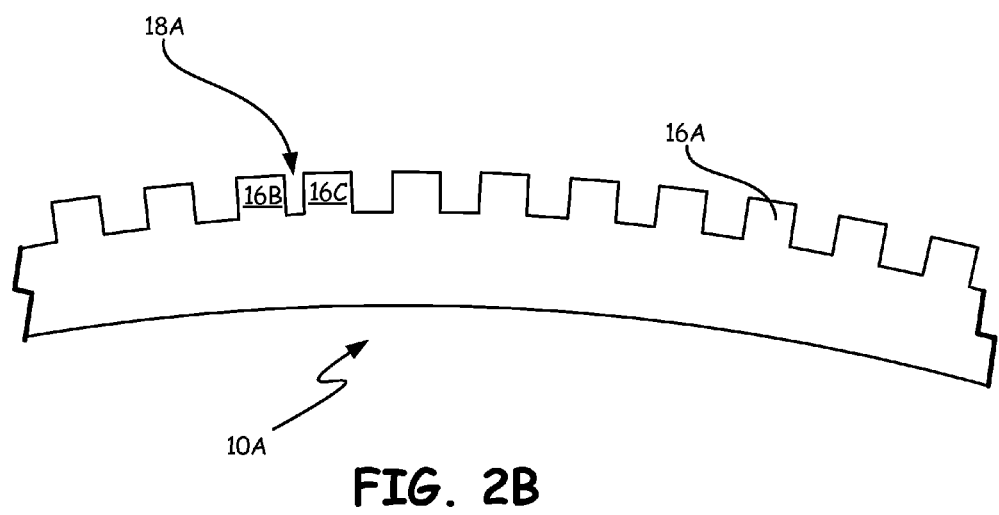
FIG. 2B is a cross-sectional view of a fan wheel having an uneven spacing indexing feature.

FIG. 2B is a partial cross-sectional view of rotating component 10A illustrating an alternative indexing feature 18A. In the embodiment shown in FIG. 2B, indexing feature 18A is a portion of rotating component 10 along which teeth 16A are not uniformly spaced, in that two teeth 16B and 16C are more densely spaced than the otherwise uniform spacing pattern of teeth 16A about the circumference of rotating component 10A.

Various other indexing features 18 are possible that identify a specific position along rotating component 10.

Figure 3:
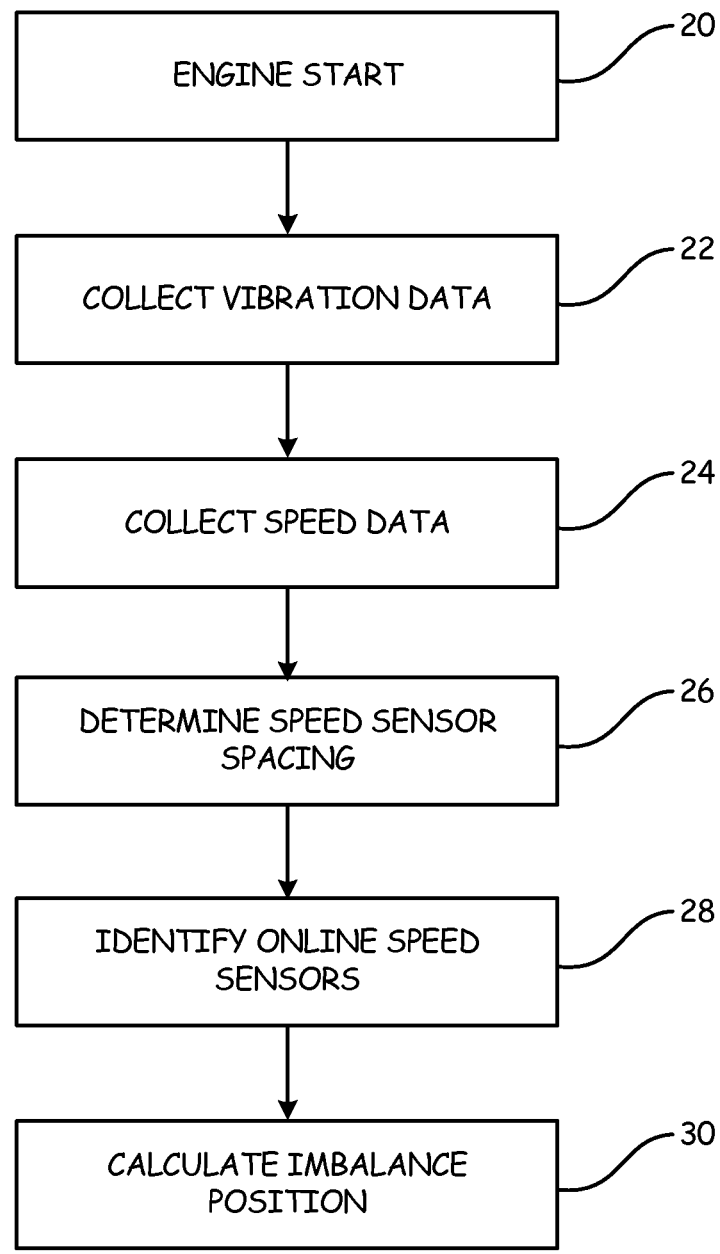
FIG. 3 is a flowchart of a method for calculating an imbalance position.

FIG. 3 is a flow chart illustrating a method by which engine control system 12 (FIG. 1) can determine an imbalance position on a rotating component.

At step 20, an engine startup sequence occurs. Often, an engine control system will determine the position of the speed sensors which it is connected to at engine startup, since the wiring harnesses are moved while the engine is off.

At step 22, vibration data is collected. Vibration data may indicate that a rotating component is improperly balanced. It is often desirable to detect the imbalanced condition so that remedial action can be taken to correct it, such as adding, removing, or adjusting balancing weights on the rotating component.

At step 24, speed data is collected. For example, in the embodiment shown in FIG. 1, one or more speed sensors S1, S2, and S3 send data regarding the time between teeth passing. In that embodiment, because engine control system 12 knows the distance between adjacent teeth 16, the speed of the rotating component can be determined. The speed may be expressed as an angular frequency, i.e. the amount of time required for one full rotation of the rotating component. Thus, calculating the first rotational position of the first speed sensor includes measuring a first time between when the indexing feature passes a zero position and the first location, and dividing the first time by a full rotation time, and multiplying the result by 360°. Likewise, calculating the second rotational position of the second speed sensor includes measuring a second time between when the indexing feature passes a zero position and the second location, and dividing the second time by a full rotation time, and multiplying the result by 360°.

At step 26, the spacing of the speed sensors is determined. This spacing is determined by measuring the difference in time between when the sensors indicate that an indexing feature has passed, dividing that time by the time for one full rotation of the rotating component, and multiplying the result by 360° as described with respect to Equation 1, above.

At step 28, the sensors attached to the engine control system are identified based on the spacing between speed sensors determined at step 26. The engine control system may receive data from any of several speed sensors, depending on the configuration of wiring harnesses that selectively connect the speed sensors to the engine control system. The possible positions for the speed sensors are known. Because the speed sensors are not uniformly spaced about the circumference of the rotating component, any two speed sensors have a unique spacing. Thus, based on the spacing calculated at step 26, the online speed sensors can be identified by a lookup function.

At step 30, an imbalance position is calculated. In the event that an imbalanced condition is identified by vibration sensors, the engine control system can correlate that condition to the exact position of the rotating component. A time-dependent function for the position of the rotating component can be ascertained based on which speed sensors the engine control system is connected to, when the indexing feature is passing each speed sensor, and what the angular frequency of the rotating component is.

As described herein, backup speed sensors may be included to measure the speed and position of a rotating component. So long as all the speed sensors are arranged such that the distance between any two sensors is unique, a controller can determine which of the sensors it is connected to. Once the controller has determined which sensors it is connected to, the controller can derive a time-dependent function for the position of the rotating component, which may be correlated with a vibration sensor to identify an imbalance position on the rotating component.

Discussion of Possible Embodiments

The following are non-exclusive descriptions of possible embodiments of the present invention.

A speed sensing system includes a wheel with a plurality of teeth. The teeth are arranged in a circumferentially uniform pattern about the wheel. An indexing feature is also arranged on the wheel. A first speed sensor is located adjacent to an outer circumference of the wheel and configured to detect the presence of the indexing feature at a first circumferential location. A second speed sensor is located adjacent to the outer circumference of the wheel and configured to detect the presence of the indexing feature at a second circumferential location. An engine control system is electrically connected to receive data regarding the presence of the indexing feature from the first speed sensor and the second speed sensor. The engine control system determines the locations of the first and second speed sensors based on the received data and prior knowledge of possible sensor locations relative to one another.

The system of the preceding paragraph can optionally include, additionally and/or alternatively, any one or more of the following features, configurations and/or additional components:

The system may also include a third speed sensor configured to detect the presence of the indexing feature at a third location on the rotational path, wherein the first location, the second location, and the third location are spaced non-uniformly about the outer circumference of the wheel path. The system may also include a zero position defined on the outer circumference of the wheel path, wherein the first location is 33° from the zero position, the second location is 144° from the zero position, and the third location is 274° from the zero position. The system may also include a plurality of speed sensors configured to detect the presence of the indexing feature at a plurality of locations on the outer circumference of the wheel path.

According to another embodiment, a method of initializing speed sensors in a rotational system includes detecting the presence of an indexing feature at a first location on an outer circumference of a wheel path using a first speed sensor, detecting the presence of an indexing feature at a second location on the outer circumference using a second speed sensor, calculating a first rotational position of the first speed sensor and a second rotational position of the second speed sensor, and determining a sensor spacing of the first speed sensor and the second speed sensor.

The method of the preceding paragraph can optionally include, additionally and/or alternatively, any one or more of the following features, steps, configurations and/or additional components:

The indexing feature may be located on a wheel having a plurality of teeth. Calculating the first rotational position of the first speed sensor may include measuring a first time between when the indexing feature passes a zero position and the first location, and dividing the first time by a full rotation time, and multiplying the result by 360°, and calculating the second rotational position of the second speed sensor includes measuring a second time between when the indexing feature passes a zero position and the second location, and dividing the second time by a full rotation time, and multiplying the result by 360°. A third sensor may be arranged at a third location on the outer circumference. The first sensor may be located 33° from the zero position, the second sensor may be located 144° from the zero position, and the third sensor may be located 274° from the zero position. Determining the sensor spacing of the first speed sensor and the second speed sensor may include subtracting the first rotational position from the second rotational position. The engine control system may identify the location of each of the first sensor and second sensor based on the difference between the first rotational position and the second rotational position. The indexing feature may be one of the group consisting of an offset tooth or a missing tooth. An engine control system may be electrically connected to each of the first sensor and the second sensor. The engine control system, the first sensor, and the second sensor may be electrically connected via a movable wiring harness. The rotational path may be defined by a wheel mechanically coupled to a fan shaft of a gas turbine engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A speed sensing system for a rotational component having a plurality of teeth arranged in a circumferentially uniform pattern about the rotational component comprising:
   a rotational component having:
      a plurality of teeth arranged in a circumferentially uniform pattern about the rotational component; and
      an indexing feature;
   a first speed sensor located in a first one of three or more predetermined possible locations adjacent to an outer circumference of the rotational component and configured to detect the presence of the indexing feature at a first circumferential location;
   a second speed sensor located in a second one of the three or more predetermined possible locations adjacent to the outer circumference of the rotational component and configured to detect the presence of the indexing feature at a second circumferential location; and
   an engine control system electrically connected to receive data regarding the presence of the indexing feature from the first speed sensor and the second speed sensor, wherein the engine control system determines the first and second locations of the first and second speed sensors based on the received data and prior knowledge of the predetermined possible sensor locations relative to one another.

2. The system of claim 1, and further comprising a third speed sensor configured to detect the presence of the indexing feature at a third location on the rotational path, wherein the first location, the second location, and the third location are spaced non-uniformly about the outer circumference of the rotational path.

3. The system of claim 2, and further comprising a zero position defined on the outer circumference of the rotational path, wherein the first location is 33° from the zero position, the second location is 144° from the zero position, and the third location is 274° from the zero position.

4. The system of claim 1, wherein the first and second speed sensors are selected ones of a plurality of speed sensors configured to detect the presence of the indexing feature at a plurality of locations on the outer circumference of the rotational path.

5. A method of initializing speed sensors in a rotational system, the method comprising:
   detecting the presence of an indexing feature at a first location on an outer circumference of a rotational path using a first speed sensor;
   detecting the presence of an indexing feature at a second location on the outer circumference using a second speed sensor; and
   determining the first and second speed sensors locations by providing input based on a spacing between predetermined possible locations of the first speed sensor and the second speed sensor and calculating the spacing between the first speed sensor and the second speed sensor.

6. The method of claim 5, wherein the indexing feature is located on a wheel having a plurality of teeth.

7. The method of claim 5, wherein:
   calculating the location of the first speed sensor includes measuring a first time between when the indexing feature passes a zero position and the first location, and dividing the first time by a full rotation time, and multiplying the result by 360°; and
   calculating the location of the second speed sensor includes measuring a second time between when the indexing feature passes a zero position and the second location, and dividing the second time by a full rotation time, and multiplying the result by 360°.

8. The method of claim 5, wherein the predetermined possible locations of the first speed sensor and the second speed sensor include first, second and third possible locations.

9. The method of claim 8, wherein:
   the first possible location is 33° from a zero position;
   the second possible location is 144° from the zero position; and
   the third possible location is 274° from the zero position.

10. The method of claim 7, wherein determining the sensor spacing of the first speed sensor and the second speed sensor includes subtracting the first time from the second time, then dividing the result by a total rotation time of a rotating component.

11. The method of claim 10, wherein the engine control system identifies the location of each of the first sensor and second sensor based on the difference between the location of the first sensor and the location of the second sensor.

12. The method of claim 5, wherein the indexing feature is an offset tooth or a missing tooth.

13. The method of claim 5, wherein determining the location of the first speed sensor and the second speed sensor is performed by an engine control system electrically connected to each of the first sensor and the second sensor.

14. The method of claim 13, wherein the engine control system, the first sensor, and the second sensor are electrically connected via a movable wiring harness.

15. The method of claim 5, wherein the rotational path is defined by a wheel mechanically coupled to a fan shaft of a gas turbine engine.

* * * * *